United States Patent
Baym et al.

(10) Patent No.: US 9,462,822 B2
(45) Date of Patent: Oct. 11, 2016

(54) ORAL IMPLANT SYSTEM FOR RELEASING ENCAPSULATED FOOD ADDITIVES BY EXPOSURE TO ENERGY

(71) Applicant: Elwha LLC, Bellevue, WA (US)

(72) Inventors: Michael H. Baym, Cambridge, MA (US); Roderick A. Hyde, Redmond, WA (US); Jordin T. Kare, Seattle, WA (US); Eric C. Leuthardt, St. Louis, MO (US); Elizabeth A. Sweeney, Seattle, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 403 days.

(21) Appl. No.: 13/675,940

(22) Filed: Nov. 13, 2012

(65) Prior Publication Data

US 2014/0135951 A1    May 15, 2014

(51) Int. Cl.
*A23L 1/29* (2006.01)

(52) U.S. Cl.
CPC . *A23L 1/296* (2013.01); *A23L 1/29* (2013.01)

(58) Field of Classification Search
None
See application file for complete search history.

(56) References Cited

U.S. PATENT DOCUMENTS

| | | | |
|---|---|---|---|
| 3,252,803 A | 5/1966 | Belasco | |
| 3,410,457 A | 11/1968 | Brown | |
| 4,387,777 A | 6/1983 | Ash | |
| 4,918,391 A | 4/1990 | Byrd | |
| 4,999,208 A | 3/1991 | Lengerich et al. | |
| 5,388,043 A | 2/1995 | Hettinger | |
| 5,398,070 A | 3/1995 | Lee | |
| 5,411,538 A * | 5/1995 | Lin | 607/33 |
| 5,525,367 A | 6/1996 | King et al. | |
| 5,769,833 A | 6/1998 | Hasse et al. | |
| 5,824,554 A | 10/1998 | McKay | |
| 5,943,950 A | 8/1999 | Taoda et al. | |
| 6,053,738 A | 4/2000 | Ivey, Jr. | |
| 6,416,740 B1 | 7/2002 | Unger | |
| 6,425,862 B1 | 7/2002 | Brown | |
| 6,461,873 B1 | 10/2002 | Catania et al. | |
| 6,542,442 B2 | 4/2003 | Kaslon | |
| 6,593,142 B2 | 7/2003 | Kelly et al. | |

(Continued)

FOREIGN PATENT DOCUMENTS

| | | |
|---|---|---|
| WO | WO 89/10117 A1 | 11/1989 |
| WO | WO 2010/059725 A1 | 5/2010 |

OTHER PUBLICATIONS

Skirtach et al., Ultrasound stimulated release and catalysis using polyelectrolyte multilayer capsules, J. Mater. Chem., 2007, vol. 17, pp. 1050-1054.*

(Continued)

*Primary Examiner* — Mohammad Ali
*Assistant Examiner* — Bernard G Lindsay

(57) ABSTRACT

Food additives may be actively released to deliver aromatic compounds to consumers during food or drink consumption. The food additives may be contained within an encapsulation layer. The encapsulation layer may be configured to release the food additives in response to being exposed to energy provided by an activation source proximate to the food additives. The activation source may be incorporated into, or connected with, an eating utensil or an oral implant. The activation source can be manually controlled by a consumer, can be controlled based on conditions near the food additives, or can be programmed with a release schedule that defines how and when food additives are to be released.

30 Claims, 11 Drawing Sheets

(56) References Cited

U.S. PATENT DOCUMENTS

| | | | |
|---|---|---|---|
| 6,675,482 | B1 | 1/2004 | Gilbert, Jr. et al. |
| 6,850,861 | B1 | 2/2005 | Faiola et al. |
| 6,924,147 | B2 | 8/2005 | Kelly et al. |
| 6,928,870 | B1 | 8/2005 | Liebowitz |
| 7,358,226 | B2 | 4/2008 | Dayton et al. |
| 8,229,676 | B2 | 7/2012 | Hyde et al. |
| 8,285,488 | B2 | 10/2012 | Hyde et al. |
| 8,290,712 | B2 | 10/2012 | Hyde et al. |
| 8,299,930 | B2 | 10/2012 | Schmid-Schonbein et al. |
| 8,321,141 | B2 | 11/2012 | Hyde et al. |
| 8,355,875 | B2 | 1/2013 | Hyde et al. |
| 8,386,185 | B2 | 2/2013 | Hyde et al. |
| 8,392,123 | B2 | 3/2013 | Hyde et al. |
| 8,392,124 | B2 | 3/2013 | Hyde et al. |
| 8,392,125 | B2 | 3/2013 | Hyde et al. |
| 8,396,672 | B2 | 3/2013 | Hyde et al. |
| 8,398,920 | B2 | 3/2013 | Hyde et al. |
| 8,439,674 | B2 | 5/2013 | Li et al. |
| 2002/0027164 | A1 | 3/2002 | Mault et al. |
| 2002/0047867 | A1 | 4/2002 | Mault et al. |
| 2002/0104856 | A1 | 8/2002 | Clark et al. |
| 2002/0124017 | A1 | 9/2002 | Mault |
| 2003/0076983 | A1 | 4/2003 | Cox |
| 2004/0158194 | A1* | 8/2004 | Wolff et al. ............... 604/66 |
| 2004/0191313 | A1 | 9/2004 | Moest et al. |
| 2005/0184148 | A1 | 8/2005 | Perlman |
| 2006/0036395 | A1 | 2/2006 | Shaya et al. |
| 2006/0067859 | A1 | 3/2006 | Laudamiel-Pellet et al. |
| 2006/0110464 | A1 | 5/2006 | Walls et al. |
| 2007/0028453 | A1 | 2/2007 | Crow |
| 2007/0059408 | A1 | 3/2007 | Catani et al. |
| 2007/0059409 | A1 | 3/2007 | Catani et al. |
| 2007/0098856 | A1 | 5/2007 | LePine |
| 2008/0019951 | A1* | 1/2008 | Elia ................ A61C 8/00 424/93.7 |
| 2008/0021327 | A1* | 1/2008 | El-Bialy ............ C12N 13/00 600/459 |
| 2008/0069924 | A1 | 3/2008 | Zeller et al. |
| 2008/0072432 | A1 | 3/2008 | Teys et al. |
| 2008/0147515 | A1 | 6/2008 | Abraham et al. |
| 2008/0275117 | A1 | 11/2008 | Li et al. |
| 2008/0276461 | A1 | 11/2008 | Gold |
| 2009/0095164 | A1 | 4/2009 | Celeste |
| 2009/0148483 | A1 | 6/2009 | Rashid |
| 2009/0253105 | A1 | 10/2009 | Lepine |
| 2009/0285864 | A1 | 11/2009 | Godin |
| 2010/0052900 | A1* | 3/2010 | Covannon ........... A61J 3/007 340/539.12 |
| 2010/0109876 | A1 | 5/2010 | Schmid-Schonbein et al. |
| 2010/0114819 | A1 | 5/2010 | Kim et al. |
| 2010/0240962 | A1 | 9/2010 | Contant |
| 2011/0027429 | A1 | 2/2011 | Kogane |
| 2011/0125063 | A1* | 5/2011 | Shalon ............ A61B 5/0006 600/590 |
| 2011/0202553 | A1 | 8/2011 | Salemann |
| 2012/0115111 | A1 | 5/2012 | Lepine |
| 2013/0020196 | A1 | 1/2013 | Nishiwaki et al. |
| 2013/0273508 | A1 | 10/2013 | Hyde et al. |
| 2013/0284821 | A1 | 10/2013 | Homer |

OTHER PUBLICATIONS

PCT International Search Report; International App. No. PCT/US2013/069791; Apr. 25, 2014; pp. 1-4.

Madene et al., "Flavour encapsulation and controlled release—a review", Jun. 6, 2004, International Journal of Food Science and Technology 2006, 41, pp. 1-21.

Nisisako, "Microstructured Devices for Preparing Controlled Multiple Emulsions", Chem. Eng. Technol. 2008, 31, No. 8, pp. 1091-1098.

Shefer et al., "Novel Encapsulation and Controlled Release of Ingredients", Nov. 2003, Foodtechnology, vol. 57, No. 11.

Starkenmann et al., "Olfactory Perception of Cysteine-S-Conjugates from Fruits and Vegetables", J. Agric. Food Chem. 2008, 56, pp. 9575-9580.

Utada, "Monodisperse Double Emulsions Generated from a Microcapillary Device", Science, Apr. 22, 2005, pp. 537-541.

Gilbert, Jason; "HAPIfork: Buzzing Fork Offers Ultimate First-World Solution to Overeating"; Hufington Post; Jan. 8, 2013; p. 1; http://www.huffingtonpost.com/2013/01/08/hapifork-buzzing-fork-solution-overeating_n_2433222.html.

Lewinsohn et al.; "Enhanced Levels of the Aroma and Flavor Compound S-Linalool by Metabolic Engineering of the Terpenoid Pathway in Tomato Fruits"; Plant Physiology; Nov. 2001; pp. 1256-1265; vol. 127, No. 3; American Society of Plant Biologists.

Michigan Tehcnological University; "Scents that are sent: oPhone delivers aromas"; Phys.org; Feb. 12, 2014; pp. 1-2; http://phys.org/news/2014-02-scents-ophone-aromas.html.

Piombino et al.; "Saliva from Obese Individuals Suppresses the Release of Aroma Compounds from Wine"; PLOS One; Jan. 2014; pp. 1-11; vol. 9, Issue 1, e85611.

Rovner, Sophie L.; "Food That Smells Too Good to Eat, Enhancing the aroma of food might help dieters eat less"; Chemical & Engineering News; Mar. 15, 2010; pp. 51-52 (4 pages); vol. 88, No. 11; http://pubs.acs.org/doi/abs/10.1021/cen-v088n011.p051.

Ruijschop, et al.; "Retronasal Aroma Release and Satiation: a Review"; Journal of Agricultural and Food Chemistry; 2009; pp. 9888-9894; vol. 57, No. 21; American Chemical Society.

The Conversation; "Is that a risotto in your pocket? The app that smells like dinner"; Phys.org; Jan. 28, 2014; pp.1-2; http://phys.org/news/2014-01-risotto-pocket-app-dinner.html.

Wikipedia; "Flavor"; Feb. 2, 2014; Printed on Feb. 3, 2014; pp. 1-7; http://en.wikipedia.org/wiki/Flavor.

* cited by examiner

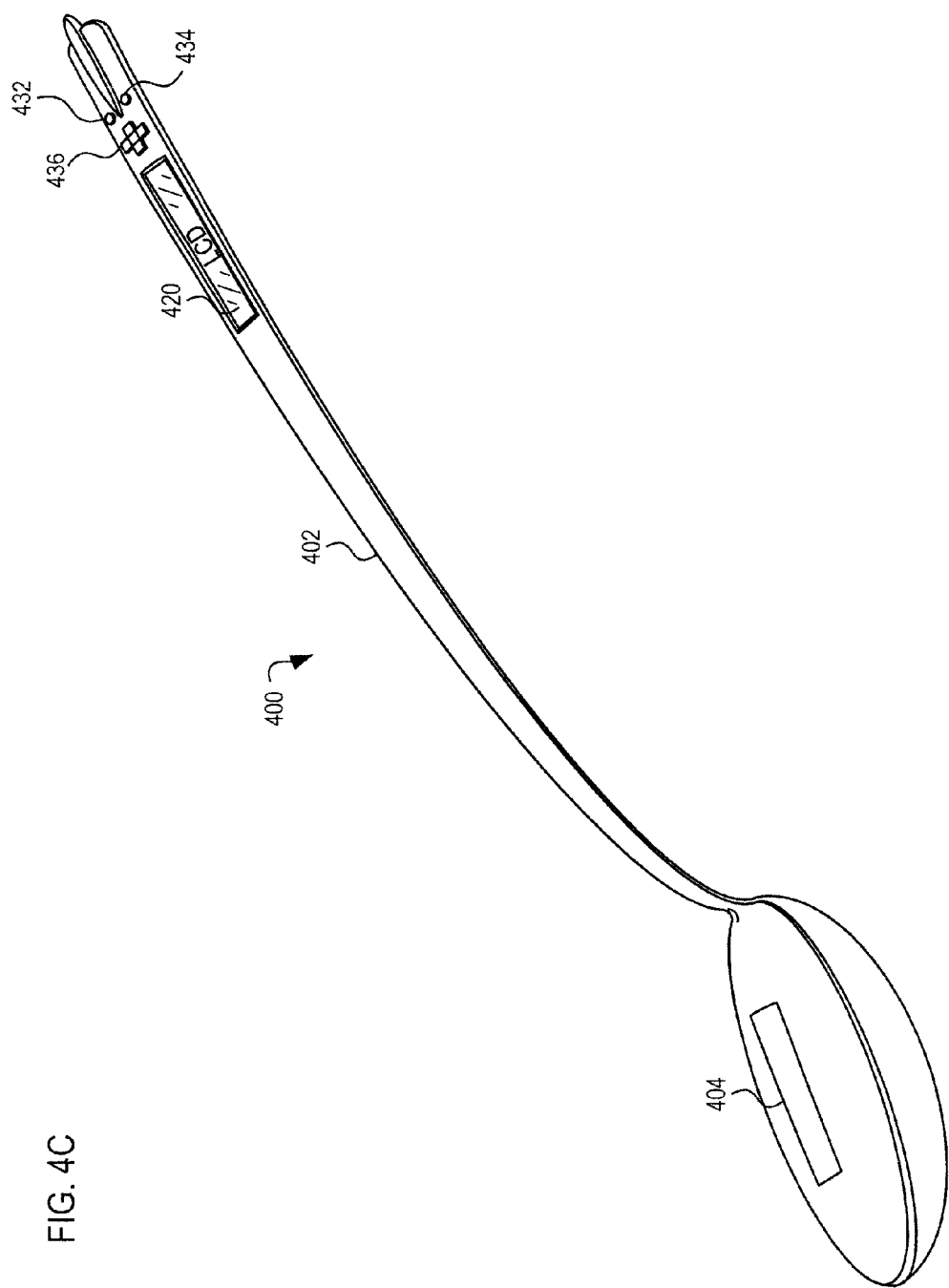

ORAL IMPLANT SYSTEM FOR RELEASING ENCAPSULATED FOOD ADDITIVES BY EXPOSURE TO ENERGY

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

RELATED APPLICATIONS

U.S. patent application Ser. No. 13/675,935, entitled ACTIVELY RELEASED FOOD ADDITIVES, naming Michael H. Baym, Roderick A. Hyde, Jordin T. Kare, Eric C. Leuthardt, Elizabeth A. Sweeney, and Lowell L. Wood, Jr. as inventors, filed 13 Nov. 2012, is related to the present application.

U.S. patent application Ser. No. 13/675,942, entitled ACTIVELY RELEASED FOOD ADDITIVES, naming Michael H. Baym, Roderick A. Hyde, Jordin T. Kare, Eric C. Leuthardt, Elizabeth A. Sweeney, and Lowell L. Wood, Jr. as inventors, filed 13 Nov. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates to food additives. More specifically, this disclosure relates to food additives and systems and methods for actively releasing the contents of the food additives.

SUMMARY

Inhaling a aromatic compounds while consuming food or drink can affect the consumer's perception of the quantity and/or quality of the consumed food or drink. In some instances, inhaling the aromatic compounds can satiate a consumer and potentially lower consumption, leading to health benefits. Accordingly, it is advantageous to provide a system and method for actively releasing food additives to deliver aromatic compounds to consumers during food or drink consumption.

In some embodiments, the food additives may be contained within an encapsulation layer. The encapsulation layer may be configured to release the food additives in response to being exposed to energy provided by an activation source proximate to the food additives. The activation source may be incorporated into, or connected with, an eating utensil or an oral implant. The activation source can be manually controlled by a consumer, can be controlled based on conditions near the food additives, or can be programmed with a release schedule that defines how and when food additives are to be released. In other embodiments, the encapsulation layer can be configured to release the food additives upon exposure to particular conditions, for example, conditions that may be found in a consumer's mouth.

In some embodiments, multiple distinct food additives can be contained within separate layers of a multi-layered encapsulation, and each layer of the encapsulation may have distinct properties. In other embodiments, multiple distinct food additives, each contained within separate encapsulation layers with distinct properties, can be introduced to the consumer at the same time. The distinct properties of the encapsulation layers provide for the food additives to be released at a range of times and/or in response to a variety of conditions.

In some embodiments, food additives can be incorporated into food products during processing and/or packaging of the food products. In other embodiments, the food additives can be packaged and sold to be added to food products by the consumer. The food additives can be packaged with an activation source and instructions for use. In some embodiments, software (or a link to software) can be provided to the consumer along with the food additive, and/or the activation source in a single package.

BRIEF DESCRIPTION OF THE DRAWINGS

FIG. 4C illustrates an example of an eating utensil including an activation source, an output mechanism, and a control mechanism.

DETAILED DESCRIPTION

Figure 1A:
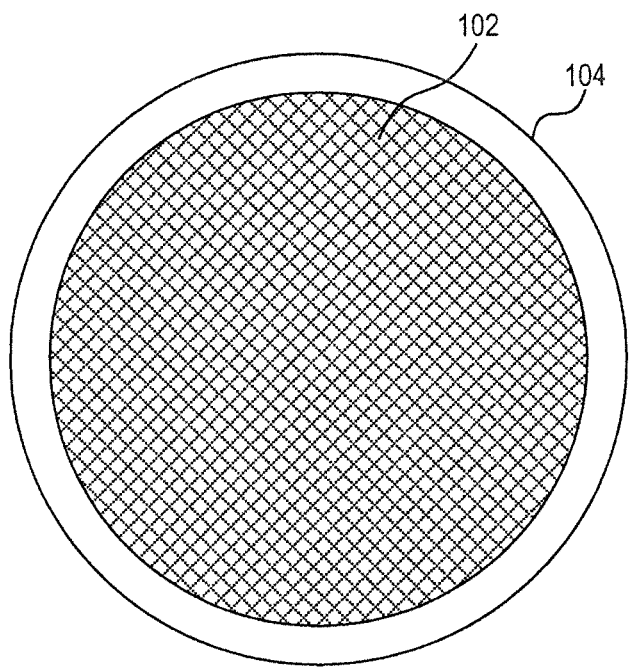
FIG. 1A illustrates a cross section of an example of an encapsulated food additive or food additive agent.

Inhaling aromatic compounds while consuming food or drink can affect the consumer's perception of the quantity and/or quality of the consumed food or drink. Aromatic compounds can enter the nasal cavity via two routes. Aromas that are inhaled through the nose enter the nasal cavity via the orthonasal pathway. Aromas are also released into the nasal cavity during the process of chewing and swallowing food and/or drink; the pathway that these aromas follow is called the retronasal pathway. Aromatic compounds delivered to the nasal cavity via these two different routes stimulate different sectors of the brain. For example, aromatic compounds delivered via the orthonasal route activate brain regions associated with the anticipation of eating and desire to consume food. On the other hand, aromatic compounds delivered via the retronasal route activate brain regions associated with the sense of reward that comes from eating food. The former may cause a person to feel hungry and possibly eat more than necessary while the latter may cause a feeling of satiation and therefore the person may eat less, potentially leading to health benefits.

In some embodiments, food additives that produce aromatic compounds can be encapsulated such that the timing and/or location of their release can be controlled. For example, a food additive or food additive agent may be surrounded by an encapsulation layer that is configured to release the food additive or food additive agent upon exposure to certain conditions.

In some embodiments, the encapsulated food additives can be included in a food product by a manufacturer. In other embodiments, the encapsulated food additives can be provided to the end user or consumer and can be added to food products prior to consumption. In some embodiments, multiple distinct food additives or food additive agents can be contained within separate layers of a multi-layered encapsulation, each layer of the encapsulation may have distinct properties. In other embodiments, multiple distinct food additives or food additive agents, each contained within separate encapsulation layers with distinct properties, can be introduced to the consumer at the same time. The distinct properties of the encapsulation layers provide for the food additives to be released at a range of times and/or in response to a variety of conditions.

In some embodiments, the food additives or food additive agents can be released from their encapsulated state upon exposure to energy from an activation source. For example, an activation source may be coupled with a utensil body and configured to expose at least one encapsulated food additive to energy so as to release the food additive from its encapsulated state. The timing and/or location of releasing the food additives may be controlled by a consumer or may be preset according to a release schedule. In other embodiments, the activation source may be coupled with an oral implant body.

Some of the infrastructure that can be used with embodiments disclosed herein is already available, such as general-purpose computers, computer programming tools and techniques, digital storage media, and communication networks. A computing device may include a processor such as a microprocessor, microcontroller, logic circuitry, or the like. The processor may include a special purpose processing device such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1A illustrates a cross section of an example of a food additive 102 (or a food additive agent) and an encapsulation layer 104. In the following description, the term "food additive" may be understood to refer to a "food additive agent" in some embodiments. For example, as used herein, the term "food additive" may be used in some instances to refer to both an aroma-producing food additive or a food additive agent and its surrounding encapsulation layer. The food additive 102, as described above, can be configured to produce an aroma when released from encapsulation. Aroma producing food additives may include esters, linear or cyclic terpenes, aromatic compounds, amines, alcohols, aldehydes, ketones, lactones, thiols, or the like. In some embodiments, the food additive 102 or food additive agent is configured to change the odor, aroma, taste, texture, temperature, and/or color of a food product when released. In some embodiments, the food additive 102 or food additive agent comprises a chemical selected to stimulate (or to block) a taste receptor; it may affect sweet, bitter, sour, salty, or umami taste sensations. In some embodiments, the food additive 102 may be configured to cause a consumer of the food product to be satiated. In some embodiments, a satiety inducing food additive may comprise an odorant such as isoamyl acetate, aromas indicative of foods such as peppermint, bananas, green apples, sweeteners, or the like. Appetite reducing food additives may induce foul or unpleasing tastes or odors. In other embodiments the food additive 102 may be configured to increase a consumer's appetite. In yet other embodiments, the food additive 102 may be configured to increase the shelf life of a food product by providing a boost to the food product's natural aroma level that typically declines as the product ages.

In some embodiments, the food additive 102 may be an emulsion or mixture of various particular food additives or food additive agents. For example, in addition to aromatic compounds, the food additive 102 may include bacteria, enzymes, or other naturally occurring or synthetic agents. In some embodiments, for example, bacteria that naturally occurs in a consumer's mouth and contributes to retroaromas (aromas experienced via the retronasal pathway) can be included with one or more aroma-based flavorings formulated to stimulate the retronasal olfaction. The increased bacteria can lead to a longer lasting effect as the retroaromas tend to linger longer when naturally produced by bacteria in the mouth.

As depicted in FIG. 1A, the food additive 102 or food additive agent is enclosed in an encapsulation layer 104. The encapsulation layer 104 can be configured to release the food additive 102 or food additive agent upon exposure to particular conditions. For example, the encapsulation layer 104 may comprise a reactive liposphere or liposome, an acoustically reactive liposphere or liposome, a microbubble, an electromagnetic energy absorber, or the like. In some embodiments the food additive 102 may be stored in the encapsulation layer 104 under pressure. In such embodiments, the food additive 102 may be more widely distributed when it is released from the encapsulation layer 104 based on the pressure difference.

In some embodiments, the encapsulation layer 104 is configured to release the food additive 102 when exposed to energy from an activation source. In one such embodiment, the encapsulation layer 104 may comprise a material that has an acoustic resonance matching an ultrasonic frequency emitted by the activation source. In another embodiment, the encapsulation layer 104 may comprise a material that has a resonance that matches an electromagnetic frequency emitted by the activation source. In other embodiments, the encapsulation layer 104 may be configured to release the food additive 102 in response to the activation source emitting energy at a particular frequency value.

In some embodiments, the encapsulation layer 104 may be configured to release the food additive 102 in response to the activation source emitting energy within a particular frequency range. In other embodiments, the encapsulation layer 104 may be configured to release the food additive 102 in response to the activation source emitting energy at a plurality of frequency values or within a plurality of frequency ranges. The encapsulation layer 104 may be configured to release the food additive 102 in response to various frequency values or a frequency within a frequency range or plurality of frequency ranges to accommodate being used with various activation sources.

In some embodiments, the encapsulation layer 104 may be sensitive to the intensity of the energy emitted by the activation source. In such embodiments, the encapsulation layer 104 may be configured to release the food additive 102 in response to the activation source emitting energy at a particular source intensity, within a particular source intensity range, or at a plurality or source intensities. The encapsulation layer 104 may be configured to release the food additive 102 in response to various source intensities in order to accommodate being used with various activation sources.

Figure 1B:
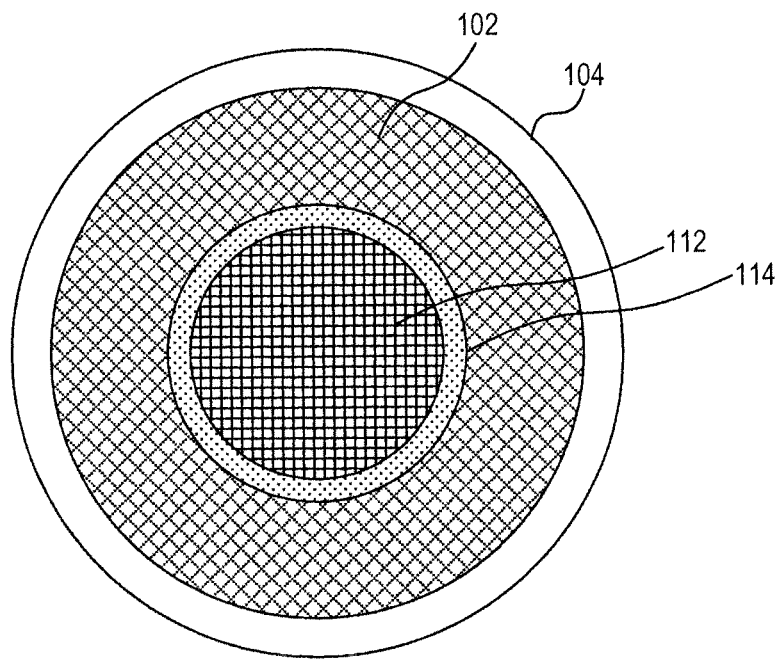
FIG. 1B illustrates a cross section of an example of multiple food additives or food additive agents encapsulated in a multi-layered encapsulation.

FIG. 1B illustrates a cross section of an example of multiple food additives or food additive agents encapsulated in a multi-layered encapsulation. In some embodiments, such as the example embodiment of FIG. 1B, a second encapsulation layer 114 may be encapsulated within a first encapsulation layer 104. In some embodiments, each layer of the multi-layer encapsulation may be configured to release its contents in response to a respective form, frequency, and/or intensity of energy emitted by the activation source or other environmental conditions. Additionally, in some embodiments, the second encapsulation layer 114 may be configured to release the encapsulated food additive 112 or food additive agent at a point in time after the second encapsulation layer 114 has been released from the first encapsulation layer 104.

In some embodiments, the second encapsulation layer 114 is configured to release the food additive 112 or food additive agent upon exposure to ambient air. In other embodiments, the second encapsulation layer 114 is configured to release the food additive 112 upon exposure to particular conditions within a consumer's mouth. For example, the particular conditions within a consumer's mouth may include: the presence of a particular chemical, the presence of a particular pH level, the presence of a pH level within a particular range, a particular temperature, a temperature within a particular range of temperatures, a particular humidity level, or the like.

In some embodiments, the activation source may be programmed to release the contents of the first encapsulation layer 104 and the second encapsulation layer 114 at different times according to a release schedule and/or other specific conditions. For example, in one embodiment, the first encapsulation layer 104 may be configured to release its contents (e.g., a food additive 102 and/or a second encapsulation layer 114) in response to the activation source emitting energy at a first frequency value, while the second encapsulation layer 114 is configured to release its contents (e.g., a food additive 112) in response to the activation source emitting energy at a second frequency value different from the first frequency value. In other embodiments, the first encapsulation layer 104 and the second encapsulation layer 114 may each be configured to release its respective contents in response to a respective emission from the activation source, the first emission having characteristics different from the second emission. The emission may be one of, for example: energy at a particular frequency, energy at a frequency within a range of frequencies, energy at a particular intensity, or an intensity within a range of intensities.

According to some embodiments, a mixture of various encapsulated food additives may be used to much the same effect as a multi-layered encapsulation. For example, a mixture of two different encapsulated food additives, each being configured to release its food additive contents in response to a unique emission from the activation source or other environmental condition. Moreover, a mixture of encapsulated food additives may give greater control over when and where the food additives are released from encapsulation. In some embodiments, a set release schedule for each of the food additives in the mixture may be used to create a desired effect.

Figure 2A:
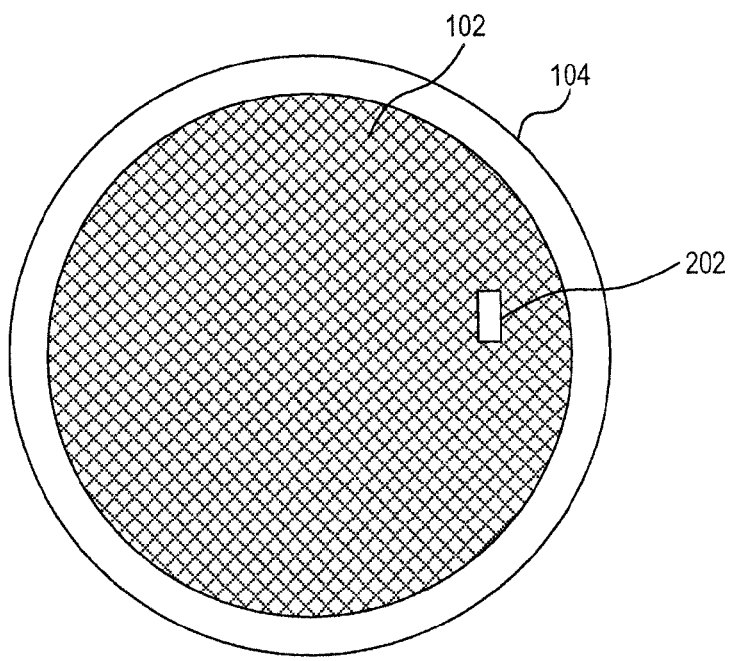
FIG. 2A illustrates a cross section of an example of an encapsulated food additive or food additive agent including an identification tag.

FIG. 2A illustrates a cross section of an example of an encapsulated food additive 102 or food additive agent including an identification tag 202. In some embodiments, as shown in FIG. 2A, the identification tag 202 may be incorporated into the encapsulation layer 104 and used to track food additives prior to being released from encapsulation. The identification tag 202 may be, for example, a radio-frequency identification (RFID) tag, an odorant, or a fluorescent molecule. In some embodiments, the RFID tag may be microscopic and edible. The identification tag 202 may wirelessly communicate with (or be otherwise trackable by) an activation source, a personal computer, or other device. Being able to track the encapsulated food additives may lead to more precision in releasing the food additives and therefore better results.

Figure 2B:
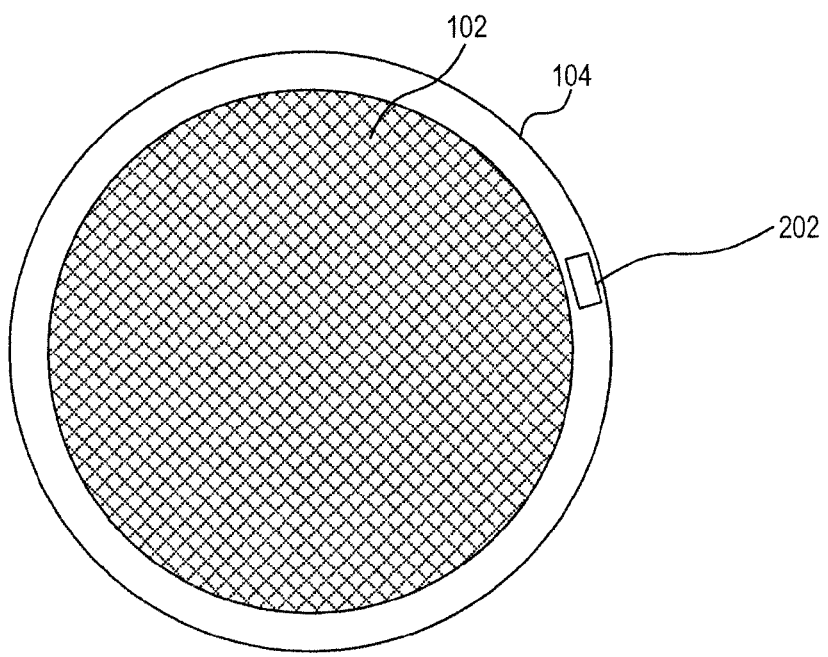
FIG. 2B illustrates a cross section of an example of an encapsulated food additive or food additive agent including an identification tag.

FIG. 2B illustrates a cross section of an example of an encapsulated food additive 102 or food additive agent including an identification tag 202. In some embodiments, as depicted in FIG. 2B, the identification tag 202 may be incorporated into the food additive 102 or food additive agent. Incorporating the identification tag 202 into the food additive 102 or food additive agent may allow the food additive 102 to be precisely tracked before and/or after being released from encapsulation. In one embodiment, the encapsulation layer 104 may provide a barrier to detecting the identification tag 202 and therefore the presence of the food additive 102 or food additive agent may only be detected after being released from encapsulation.

Encapsulated food additives and food additive agents may be provided to consumers in many forms. In some embodiments, food additives may be incorporated into food products by a food product manufacturer during the processing of food products or prior to packaging a food product. In other embodiments, food additives may be packaged and provided to consumers independently of a food product. Depending on the type of encapsulation layer, the desired effect of the food additive, and other factors, the food additive may be configured to be added to a food product prior to or after a cooking/preparation process.

Figure 3A:
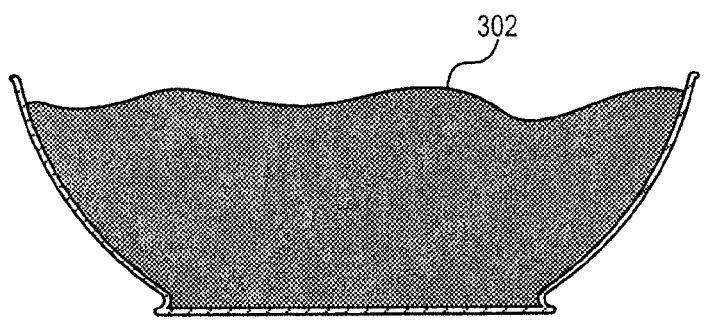
FIG. 3A illustrates an example of a food product including a food additive uniformly mixed throughout a food portion.
Figure 3B:
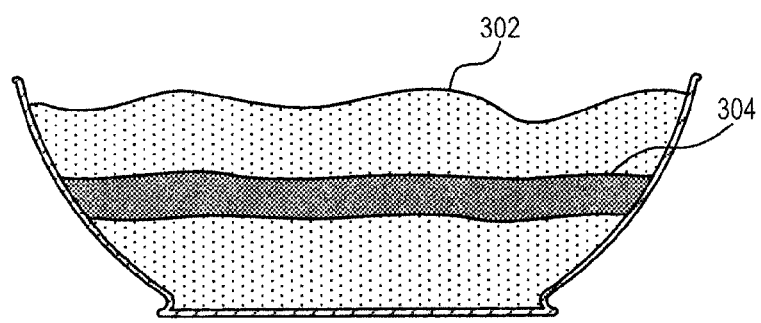
FIG. 3B illustrates an example of a food product including a food additive concentrated at a particular location within a food portion.
Figure 3C:
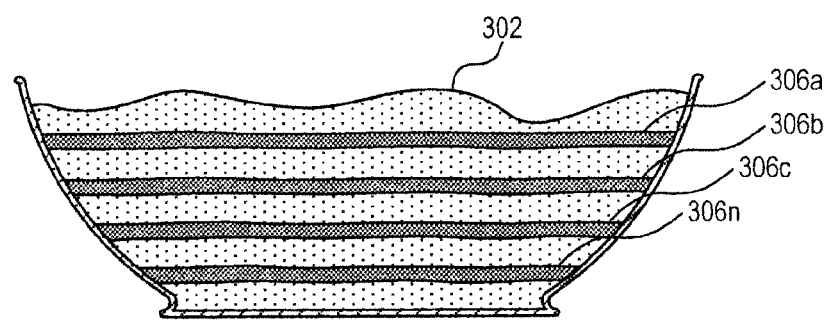
FIG. 3C illustrates an example of a food product including a food additive distributed in a pattern throughout a food portion.

FIGS. 3A, 3B, and 3C illustrate an example of a food product including a food additive as discussed herein. The food product of examples of FIGS. 3A, 3B, and 3C may each include a food portion 302 and a food additive. In some embodiments, the food portion 302 may be, for example, a liquid, a solid, a gel, a suspension, or the like. In some embodiments, the food additive may be uniformly mixed throughout the food portion, as shown for example in FIG. 3A. In other embodiments, the food additive may be concentrated at a particular location within the food portion 302, as shown, for example, as a concentration 304 in FIG. 3B. The food additive may be concentrated, for example, near the surface of the food portion, near the center of the food portion, within a particular sub-region of the food portion, near (or away from) the opening section of a container holding the food portion, or in any other location that fits with the purpose of the food additive. For example, if the purpose of the food additive is to satiate a consumer after a certain caloric intake, the food additive may be concentrated at a point where that caloric intake would be met. In another embodiment, the food additive may be distributed in a pattern throughout the food portion 302. For example, the food additive may be distributed as stripes 306a-306n through the food portion, as shown in the example of FIG. 3C.

As introduced above, the encapsulation layer surrounding food additives or food additive agents may be configured to release the food additive or food additive agent in response to being exposed to energy provided by an activation source. In one embodiment, the activation source may be incorporated into an eating utensil. In another embodiment, the activation source may be incorporated into an oral implant or other device in or near the user's mouth.

Figure 4A:
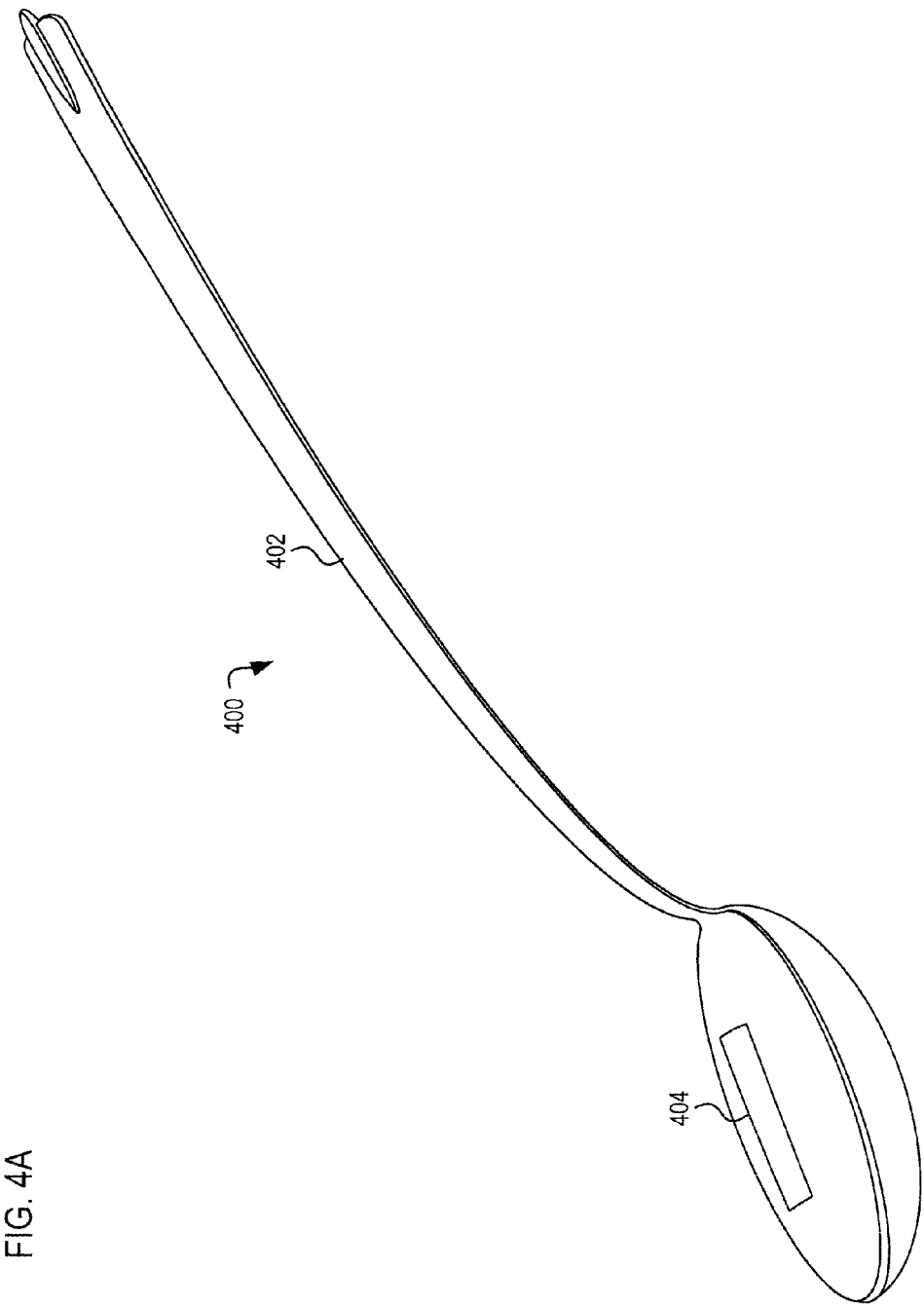
FIG. 4A illustrates an example of an eating utensil including an activation source.

FIG. 4A illustrates an example of an eating utensil including an activation source. In the example of FIG. 4A, the eating utensil 400 includes a utensil body 402 and an activation source 404. In some embodiments, the utensil body 402 may be a spoon, a fork, a knife, a spork, a chopstick, a bowl, a plate, a drinking straw, or the like. The activation source 404 may be coupled with the utensil body 402 and configured to expose encapsulated food additives or food additive agents to energy so as to release the food additives or food additive agents from encapsulation.

In some embodiments, the activation source 404 may be an ultrasonic source, an electromagnetic source, a radio frequency source, an infrared source, a near infrared source, or the like. In the embodiment where the activation source 404 is an ultrasonic source, the ultrasonic source may comprise an ultrasonic transducer configured to emit energy at a particular ultrasonic frequency. In one embodiment, the ultrasonic transducer may be configured to emit energy at various ultrasonic frequencies within a range of ultrasonic frequencies and/or with varying intensity. In some embodiments, the electromagnetic source may emit energy in various spectrums and intensities. For example, the electromagnetic source may emit energy in a visible spectrum, a terahertz spectrum, a microwave spectrum, and an ultraviolet spectrum, to name a few.

Figure 4B:
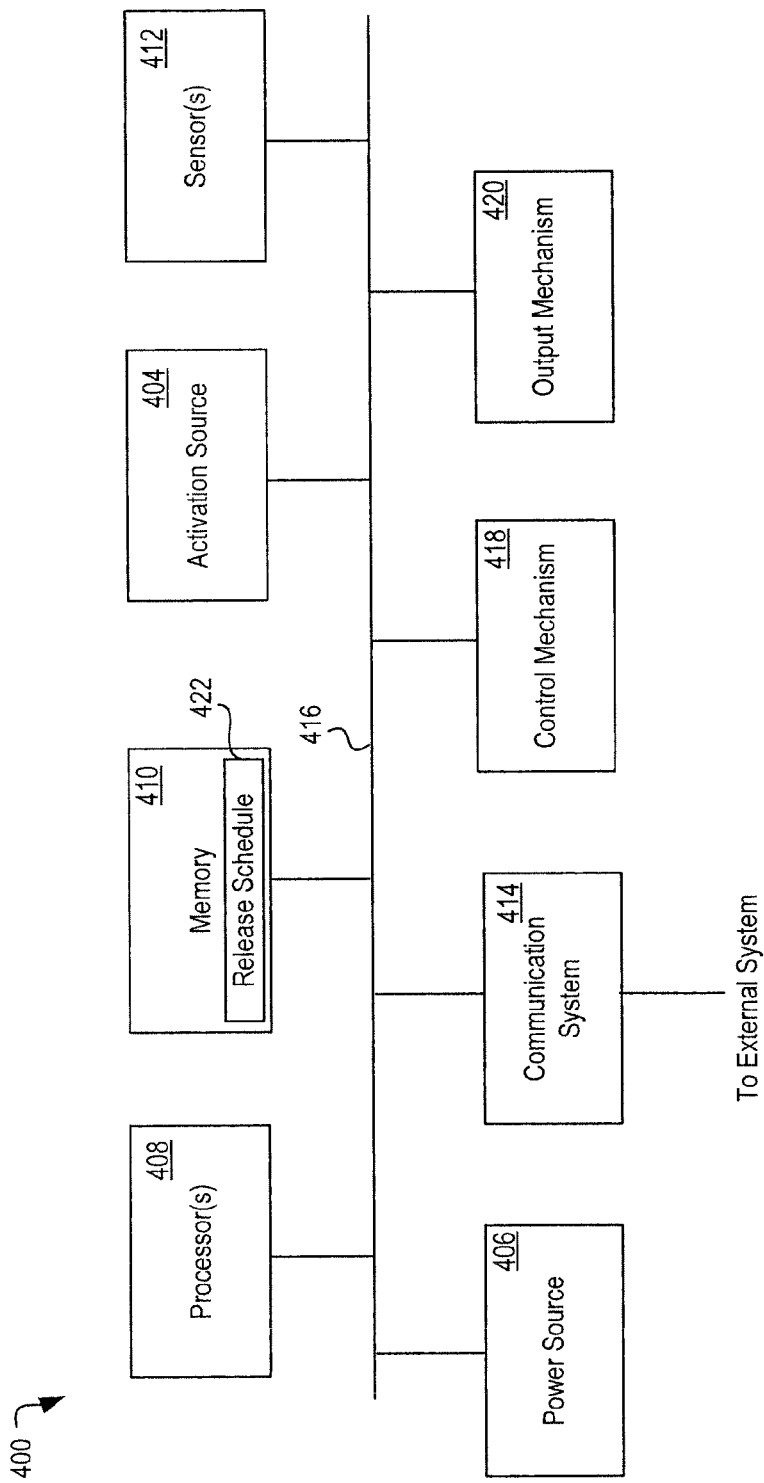
FIG. 4B illustrates a block diagram of the components of an exemplary eating utensil.

FIG. 4B illustrates a block diagram of the components of an example eating utensil 400. As illustrated in FIG. 4B, the eating utensil 400 may include, in addition to the activation source 404, a power source 406, a processor 408, a memory 410, a sensor or sensors 412, a communication system 414, a control mechanism 418, and/or an output mechanism 420, among other components, all interconnected by an interconnect 416.

In some embodiments, the power source 406 may be a battery or the like. The battery may be rechargeable and/or replaceable. In other embodiments, the power source 406 may be an energy harvesting power supply. The energy harvesting power may harvest mechanical energy, for example, when the consumer moves the utensil 400 to or from the mouth, or when the consumer bites onto a utensil or an oral implant.

According to various embodiments, processor 408 may be a microprocessor, microcontroller, logic circuitry, or the like. The processor 408 may include a special purpose processing device such as an ASIC, PAL, PLA, PLD, FPGA, or other customized or programmable device. In some embodiments, the processor may execute instructions which cause the activations source to expose the encapsulated food additives or food additive agents to energy. In one embodiment, the instructions may include determining when to cause the activation source 404 to emit energy based on a release schedule.

In some embodiments, memory 410 may include a non-transitory computer readable medium, such as a non-volatile memory, static RAM, dynamic RAM, ROM, CD-ROM, disk, tape, magnetic, optical, flash memory, or other computer readable storage medium. In one embodiment, memory 410 is configured to store a data structure representing a release schedule 422. Release schedules are discussed in more detail below.

In order to release the food additive or food additive agent from encapsulation more accurately, the eating utensil may include a variety of sensors 412. In one embodiment, the eating utensil 400 may include a sensor 412, for example a proximity sensor, to determine the position of the eating utensil relative to the consumer's mouth. In other embodiments, the eating utensil 400 may include a proximity sensor, or the like, to determine a location of the utensil within a consumer's mouth. In one embodiment, the proximity sensor may be configured to determine a relative motion of the eating utensil, for example when the eating utensil is approaching the consumer's mouth. In another embodiment, the proximity sensor may be configured to determine the relative position of the eating utensil to another body part of the consumer, for example the consumer's nose. In yet another embodiment, the proximity sensor may be configured to determine whether the consumer has placed the eating utensil within the consumer's mouth and whether the consumer's mouth has closed. In one embodiment, the eating utensil may include a photosensor to determine whether the eating utensil is within the mouth, or the eating utensil or oral implant may use the photosensor to determine closure of the mouth. In one embodiment, the eating utensil or oral implant may use an ultrasonic transducer (optionally the same as used for energy delivery to the encapsulated food additive) to determine proximity to a food product or to body parts. In one embodiment, the eating utensil or oral implant may use a RFID sensor to read RFID tags associated with the food additive. In one embodiment, the eating utensil or oral implant may use a photosource and detector to detect fluorescent tags associated with the food additive.

In some embodiments, the eating utensil 400 may include a sensor 412 that may be configured to determine contact of the utensil body 402 with a surface of the consumer's mouth. For example, in one embodiment, the sensor 412 may be a capacitive sensor, a pressure sensor, or the like configured to detect contact with the consumer's mouth. The sensor 412 may be configured to determine contact with the consumer's tongue, lip, tooth, or another interior surface of the consumer's mouth, for example. According to various embodiments, the sensor 412 may be coupled with a counter to determine the number of times a certain action has been performed by the consumer. For example, the counter may be configured to count the number of time the consumer has placed the utensil body 402 in the consumer's mouth.

In another embodiment, the eating utensil 400 (or an oral implant) may include a sensor 412 configured to track the location of an encapsulated food additive. For example, the eating utensil 400 may include a sensor 412 configured to track an identification tag as described above. According to various embodiments, the sensor 412 may be configured to determine whether an encapsulated food additive is in contact with the utensil body 402 or the position of the encapsulated food additive relative to the utensil body 402, for example, whether the encapsulated food additive is at a particular distance from the utensil body 402.

In one embodiment, the eating utensil may include a sensor 412, such as an accelerometer, to detect a consumer's motion while using the eating utensil 400. The sensor 412 may be configured to determine when the consumer is engaging in an eating or a drinking motion.

One anticipated use for the sensors 412 is to determine when to release a food additive or food additive agent from encapsulation. For example, the activation source 404 may be configured to emit energy based on what the sensor 412 detects and thereby cause the food additive or food additive agent to be released. In one embodiment, the sensor 412 may be configured to determine a quantity of food a person has consumed over a period of time and use this information to control the release of a food additive or food additive agent from encapsulation. In some embodiments, the sensor 412 may be configured to sense the quantity of food consumed by the consumer, for example, the mass, volume, or the like. Release schedules based on the quantity of food consumed, among other types of release schedules, are discussed in more detail below.

Returning to the example of FIG. 4B, in some embodiments, the eating utensil may include a communication system 414 configured to receive and/or update a release schedule. The communication system 414 may be configured to communicate with a computer system, an external database, external sensors, or external control device or system. According to some embodiments, the communication system 414 may be a wireless communication system, such as a Bluetooth™, Wi-Fi, or other radio frequency (RF) communication system. In other embodiments, the communication system 414 may be a wired communication system. In another embodiment, the communication system 414 may be an optical communication system, such as an infrared or visible spectrum communication system. In yet another embodiment, the communication system 414 may include a physical media device and a consumer may use physical media to communicate with the eating utensil 400. In some embodiments, the physical media may be removable media such as optical discs (e.g., Blu-ray discs, DVDs, CDs), memory cards (e.g., Compact Flash card, Secure Digital card, Memory Stick), floppy disks, Zip disks, magnetic tapes, or a single in-line memory module (SIMM).

Returning to the example of FIG. 4B, according to various embodiments, the eating utensil may include a control an output mechanism 420. In some embodiments the output mechanism 420 may be configured to notify the consumer of certain events. For example, the output mechanism 420 may notify the consumer that the activation source 404 has emitted energy to release a food additive. Additionally, the output mechanism 420 may be used to provide feedback to the consumer in the process of programming a release schedule, as discussed in more detail below. According to various embodiments, the output mechanism 420 may provide feedback to the consumer as haptic vibration, text or images on a display, or audio, for example.

Returning again to the example of FIG. 4B, in some embodiments, the eating utensil may include a control mechanism 418. According to various embodiments, the control mechanism 418 may be configured to allow the consumer to control the operation of elements of the eating utensil 400 including, for example, the activation source 404. In one embodiment, the control mechanism 418 may be configured to allow a consumer to download or upload a release schedule from or to a database of shared release schedules. In some embodiments the control mechanism 418 may be embedded in the eating utensil or may be external to the eating utensil and configured to communicate with the eating utensil, for example through communication system 414.

In various embodiments, the control mechanism 418 may comprise a release element, a start element, a selection element, and/or a recording element. In one embodiment the release element is configured to allow a consumer to initiate the activation source 404 by activating the release element. In response to the release element being activated, the activation source 404 exposes the encapsulated food additives to energy in order to release the food additive or food additive agents. In another embodiment, the start element may operate in a similar fashion. When a consumer activates the start element, the activation source 404 may begin to expose the encapsulated food additives or food additive agents according to a release schedule. The recording element, according to one embodiment, may be configured to allow a consumer to record a custom release schedule. In one embodiment, the recorded release schedule may be shared with other consumers by uploading the release schedule to a database of shared release schedules.

FIG. 4C illustrates an example of an eating utensil 400 including an activation source 404, an output mechanism 420, and a control mechanism. In the example of FIG. 4C, the output mechanism 420 is represented as an LCD display. The control mechanism is shown as a collection of elements 432, 434, and 436. Element 432 may be, for example, a release element or a start element as discussed above, element 434 may be a recording element, and element 436 may be a selection element. The selection element 436 in the example of FIG. 4C allows a consumer to scroll through and select from a menu displayed on the LCD output mechanism 418.

Figure 5A:
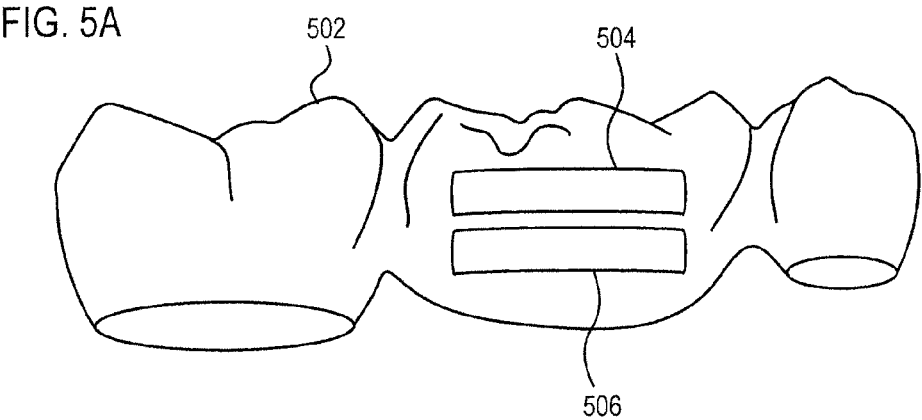
FIG. 5A-5C illustrate various embodiments of an oral implant including an activation source.
Figure 5B:
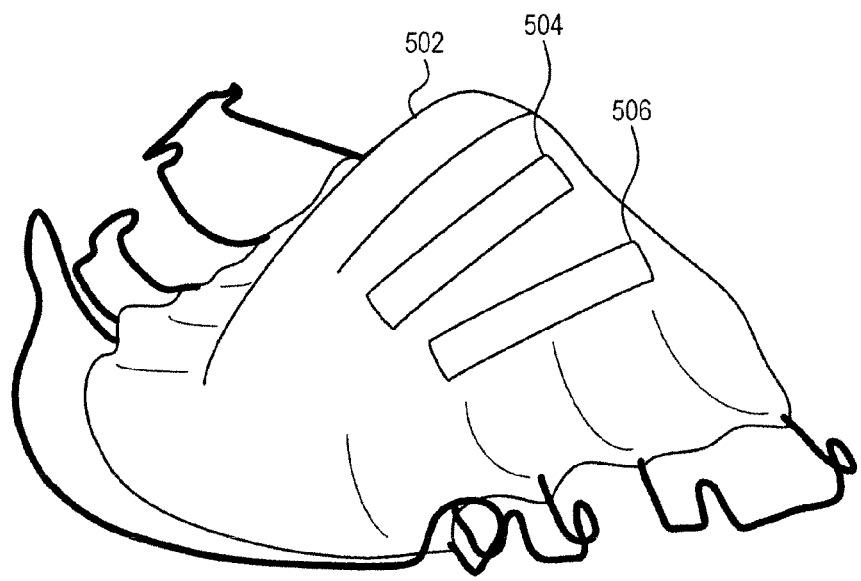
Figure 5C:
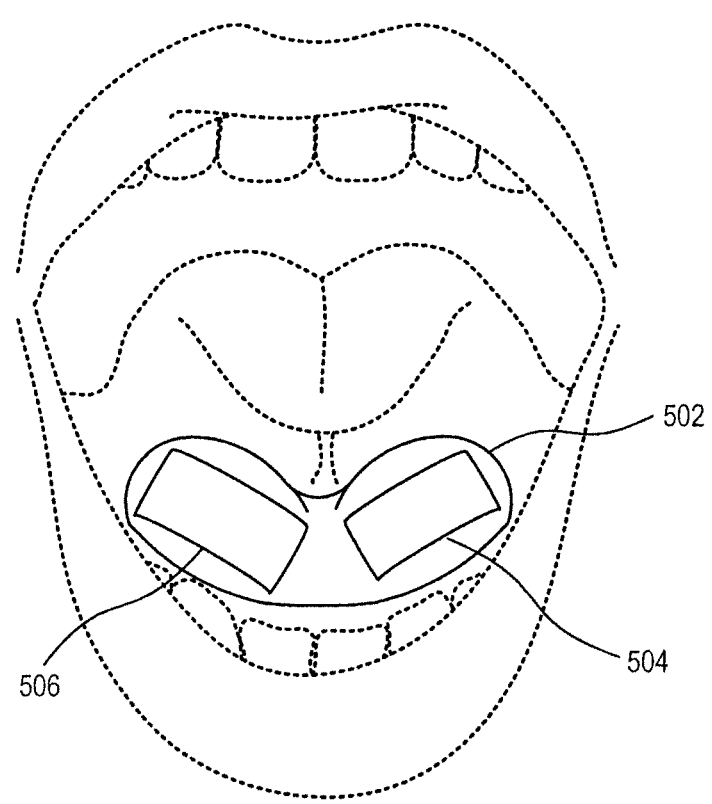

In some situations, for example when it is desired that the food additives are released from encapsulation in a consumer's mouth, an activation source outside of the consumer's mouth may not be as effective. Therefore, in some embodiments, an oral implant, or other orally placed device, may be fitted with an activation source and other components as described with regard to the eating utensil above. FIGS. 5A-5C illustrate various embodiments of an oral implant including an activation source. As used herein, an oral implant may be any orally placed device whether permanently, semi-permanently, or temporarily implanted so as to be removable. In some embodiments, the oral implant may be custom fit, for example by a dentist, or may be available in various predetermined sizes to fit a range of consumers.

In one embodiment, as illustrated in the example of FIG. 5A, the oral implant includes an implant body 502, an activation source 504, and a control mechanism 506. In various embodiments the implant body 502 may be configured to be affixed to, or cover, a tooth, or teeth, of a consumer. For example, as illustrated in FIG. 5A, the implant body may be a dental bridge structure or a dental cap. In another embodiment, as illustrated in the example of FIG. 5B, the implant body 502 of the oral implant may be in the form of a removable device, such as a retainer or tooth guard, configured to be held in place by a consumer's teeth. In another embodiment, the oral implant may be configured to be held in place by a consumer's tongue, for example as illustrated in FIG. 5C.

As described above with regard to the utensil body activation source, an oral implant embodiment, may also include a control mechanism. In addition to the embodiments described above, the control mechanism in an oral implant embodiment, may be configured to be activated by physical contact with a surface of a consumer's mouth. For example, the control mechanism may be activated by contact with the surface of a consumer's tooth or tongue.

As introduced above, an activation source may be configured to emit energy, thereby causing a food additive or food additive agent to be released from encapsulation, according to a release schedule. A release schedule may be configured to coordinate the release of various different food additives or food additive agents from encapsulation. For example, the release schedule may be configured to release a different food additive with each bite a consumer takes, release a food additive after a defined period of time or after a consumer has consumed a particular amount of food, etc.

In one embodiment, the release schedule may be stored on a machine readable medium and may be executed by a processor controlling the activation source. In one embodiments, the release schedule may based on the composition of the food additive or food additive agent to be release. In various embodiments, the release schedule may define a duration of time between releases of a single food additive, a duration of time between releases of different food additives, an order for releasing different food additives, an amount of food additive to be released (e.g., the longer the activation source emits energy, the more food additive will be released), and/or a point of time at which to release a food additive. In some embodiments, the point of time may be defined as a point in time after a consumer has initiated eating or drinking a food product including the food additive, after a consumer has taken a defined number of bites, or after a food additive has been released a defined period of time.

According to various embodiments, the release schedule may be manually entered or recorded by a consumer and/or downloaded to the eating utensil or oral implant by the consumer, for example, via the communication system. In one embodiment, a consumer may manually input a release schedule into the eating utensil or oral implant from a printed release schedule. In another embodiment, a consumer may follow a pointer to a downloadable version of the release schedule. The pointer may be, for example, a uniform resource locator (URL), a barcode, a quick response (QR) code, or the like. In another embodiment, the release schedule may be stored on removable media which can be installed in the eating utensil or oral implant or used to transfer the release schedule to a memory of the eating utensil or oral implant.

Figure 6A:
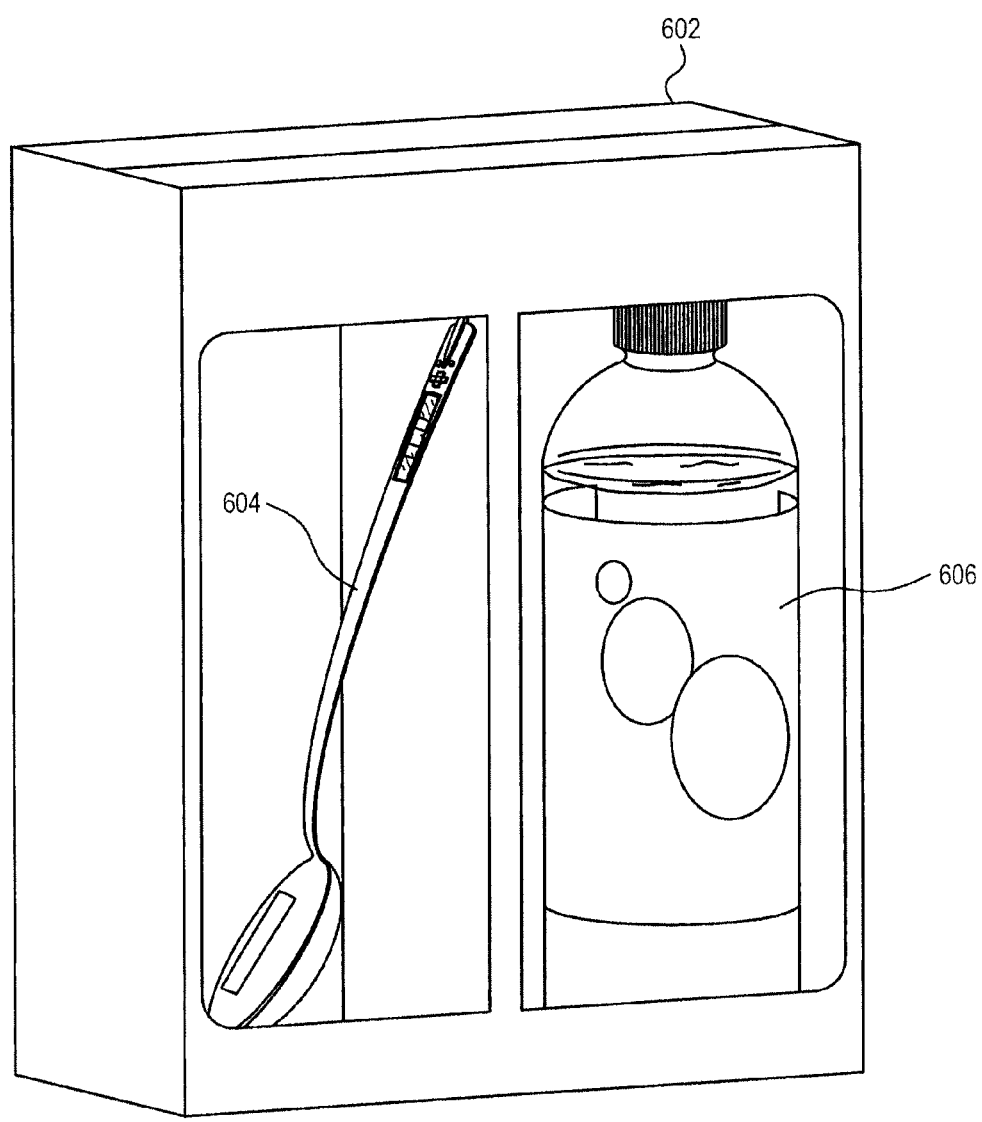
FIG. 6A illustrates a package including a container of encapsulated food additive or food additive agent and an activation source.

FIG. 6A illustrates a package including a container of encapsulated food additive or food additive agent and an activation source. In the example of FIG. 6A, the package 602 includes an eating utensil 604, such as the eating utensil described above with regard to FIGS. 4A, 4B, and 4C, and a container of encapsulated food additive 606. While the illustration of FIG. 6A shows a container of encapsulated food additive 606, it should be understood that the package may include a food product that includes encapsulated food additives, or other various configurations.

Figure 6B:
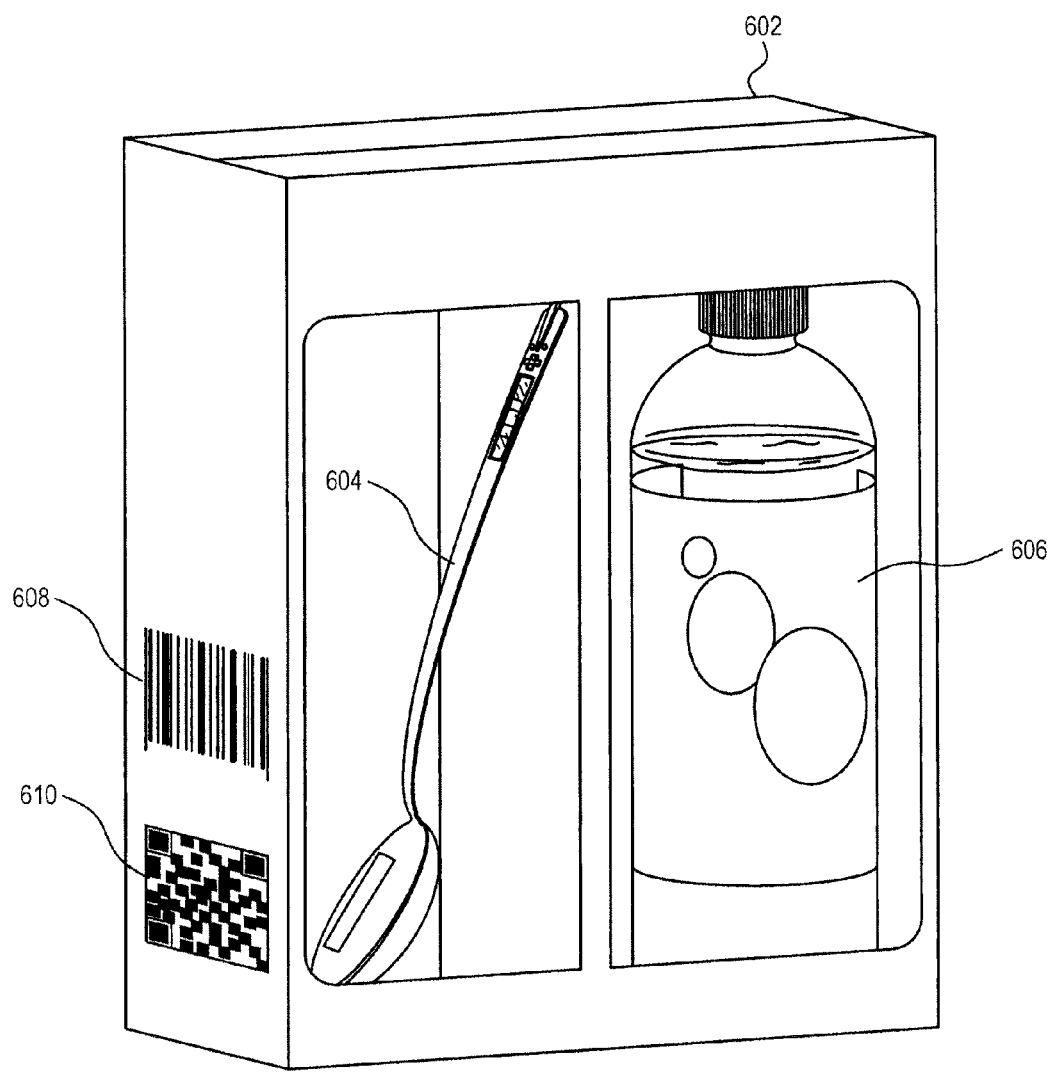
FIG. 6B illustrates a package including a container of encapsulated food additive or food additive agent and an activation source, the package having a pointer to a downloadable release schedule printed on the packaging.
Figure 6C:
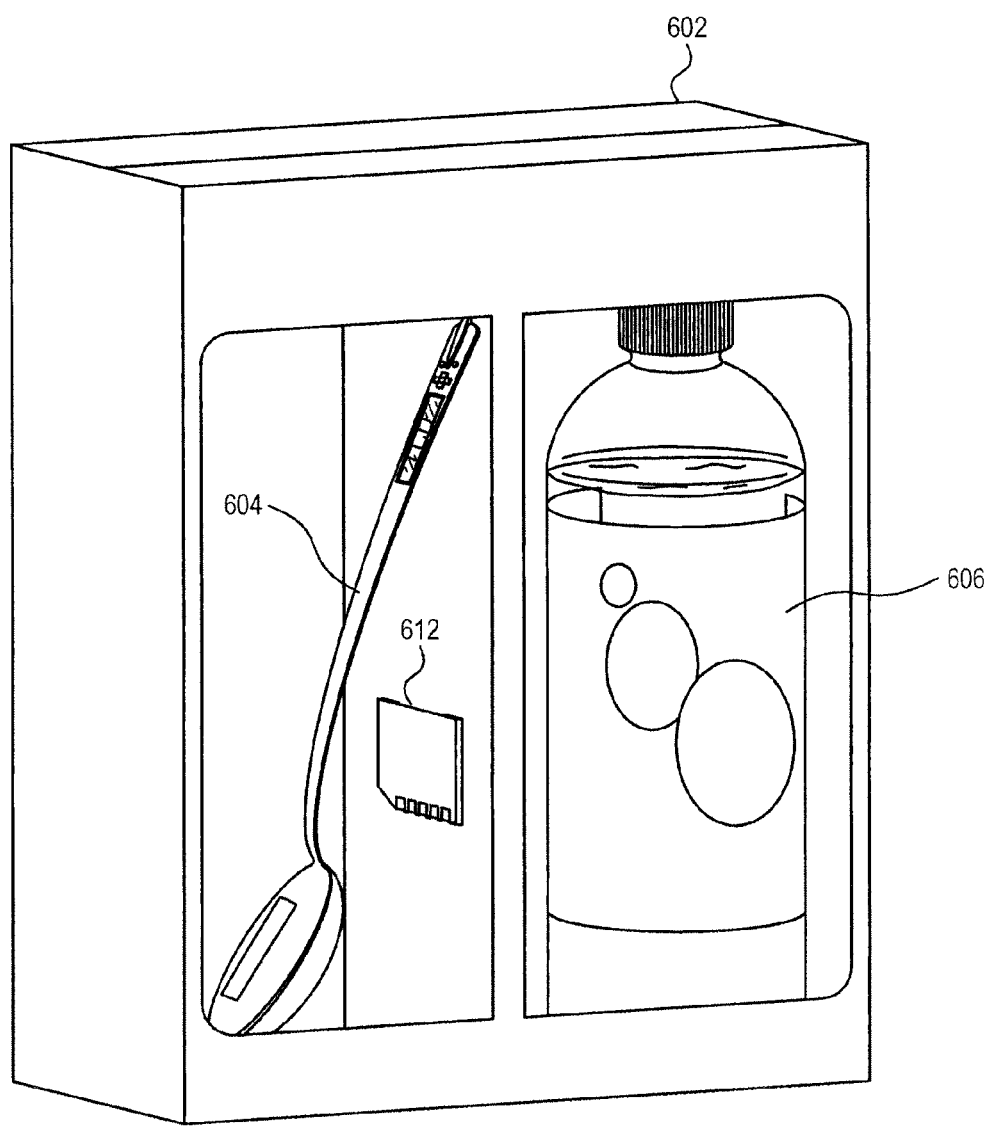
FIG. 6C illustrates a package including a container of encapsulated food additive or food additive agent, an activation source, and removable media containing a release schedule.

In some embodiments, such as those illustrated in FIGS. 6B and 6C, a release schedule may be included in the package. In the example of FIG. 6B, the release schedule may be printed on the package 602 as a pointer, such as barcode 608 or QR code 610, to a downloadable release schedule. Other pointers, such as a URL may also be printed on package 602. In one embodiment, a release schedule may be printed on package 602 that holds the food additive or a food product containing a food additive. The consumer may then manually input the release schedule from the packaging. In another embodiment, package 602 may include a release schedule stored on removable media 612, such as optical discs (e.g., Blu-ray discs, DVDs, CDs), memory cards (e.g., Compact Flash card, Secure Digital card, Memory Stick), floppy disks, Zip disks, or magnetic tapes, which can be installed in the eating utensil or used to transfer the release schedule to a memory of the eating utensil.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

What is claimed is:

1. An oral implant system, comprising:
    an implant body configured to secure the oral implant system in a consumer's mouth;
    a sensor embedded within the implant body, the sensor configured to detect a first fluorescent tag associated with a first encapsulated food additive that is within the consumer's mouth and a second fluorescent tag associated with a second encapsulated food additive that is within the consumer's mouth; and
    an activation source physically coupled to the implant body, the activation source configured to emit energy at a first frequency in the consumer's mouth to expose the first encapsulated food additive to the energy at the first frequency to release the first food additive from encapsulation based on the detection of the first fluorescent tag by the sensor that the first encapsulated food additive is within the consumer's mouth, and the activation source further configured to emit energy at a second frequency in the consumer's mouth to expose the second encapsulated food additive to the energy at the second frequency to release the second food additive from encapsulation based on the detection of the second fluorescent tag by the sensor that the second encapsulated food additive is within the consumer's mouth, wherein the energy is selected from at least one of ultrasonic energy, electromagnetic energy, or radio frequency energy.

2. The oral implant system of claim 1, wherein the oral implant system is configured to be temporarily implantable in the consumer's mouth.

3. The oral implant system of claim 1, wherein the activation source comprises an ultrasonic source.

4. The oral implant system of claim 1, wherein the activation source comprises an electromagnetic source.

5. The oral implant system of claim 1, wherein the activation source comprises a radio frequency source.

6. The oral implant system of claim 1, wherein the oral implant system further comprises a wireless communication system.

7. The oral implant system of claim 6, wherein the wireless communication system is a Bluetooth™ wireless communication system.

8. The oral implant system of claim 6, wherein the wireless communication system is a Wi-Fi wireless communication system.

9. The oral implant system of claim 6, wherein the wireless communication is an RF wireless communication system.

10. The oral implant system of claim 6, wherein the wireless communication system is configured to communicate with a computer system.

11. The oral implant system of claim 6, wherein the wireless communication system is configured to communicate with an external sensor.

12. The oral implant system of claim 6, wherein the wireless communication system is configured to communicate with a control device.

13. The oral implant system of claim 1, wherein the activation source is further configured to emit energy at the first frequency in the consumer's mouth to expose the first encapsulated food additive to the energy at the first frequency to release the first food additive from encapsulation based on a release schedule.

14. The oral implant system of claim 13, wherein the release schedule comprises a first release schedule for the first encapsulated food additive and a second release schedule for the second encapsulated food additive.

15. The oral implant system of claim 13, wherein the release schedule is programmed by the consumer.

16. The oral implant system of claim 13, wherein the release schedule is selected by the consumer.

17. The oral implant system of claim 13, wherein the release schedule is downloaded by the consumer via a communication system.

18. The oral implant system of claim 13, wherein the release schedule comprises an order for releasing the first encapsulated food additive and the second encapsulated food additive.

19. The oral implant system of claim 1, wherein the sensor comprises a photosource and a detector.

20. An oral implant system including a non-transitory, machine readable storage medium storing instructions, which when executed by a processor, cause the processor to perform operations comprising:

accessing a release schedule comprising data identifying a first encapsulated food additive and a second encapsulated food additive, and a time at which to release the first food additive and the second food additive from encapsulation; and initiating an activation source physically coupled with an oral implant system to emit energy at a first frequency in a consumer's mouth to expose the first encapsulated food additive to the energy at the first frequency according to the release schedule to release the first food additive from encapsulation based on a detection of a first fluorescent tag associated with the first encapsulated food additive by a sensor comprising a photosource and a detector that the first encapsulated food additive is within a consumer's mouth, and further initiating the activation source to emit energy at a second frequency in the consumer's mouth to expose the second encapsulated food additive to the energy at the second frequency according to the release schedule to release the second food additive from encapsulation based on a detection of a second fluorescent tag associated with the second encapsulated food additive by the sensor, wherein the sensor is coupled with the oral implant system, wherein the oral implant system is secured within the consumer's mouth, and wherein the energy is selected from at least one of ultrasonic energy, electromagnetic energy, or radio frequency energy.

21. The machine readable storage medium of claim 20, wherein the release schedule is programmed by the consumer.

22. The machine readable storage medium of claim 20, wherein the release schedule is downloaded by the consumer via a communication system.

23. The machine readable storage medium of claim 20, wherein the release schedule comprises a duration of time for releasing the first encapsulated food additive.

24. The machine readable storage medium of claim 20, wherein the release schedule comprises a time interval between releasing the first encapsulated food additive and the second encapsulated food additive.

25. The machine readable storage medium of claim 20, wherein the release schedule comprises an order for releasing the first encapsulated food additive and the second encapsulated food additive.

26. The machine readable storage medium of claim 20, wherein the release schedule comprises an amount of the first encapsulated food additive and the second encapsulated food additive to release.

27. The machine readable storage medium of claim 20, wherein the release schedule comprises a point of time for releasing the first encapsulated food additive.

28. The machine readable storage medium of claim 20, wherein the machine readable storage medium is separate from the oral implant system and the instructions are communicated to the oral implant system via a communication system.

29. The machine readable storage medium of claim 20, wherein the machine readable storage medium is removeably coupled with the oral implant system.

30. An oral implant system, comprising:
an implant body configured to secure the oral implant system in a consumer's mouth; and
an activation source physically coupled to the implant body, the activation source configured to emit ultrasonic energy at a first frequency in the consumer's mouth to expose a first encapsulated food additive to the ultrasonic energy at the first frequency, the ultrasonic energy at the first frequency configured to release the first food additive from encapsulation based on a detection by a sensor physically coupled to the implant body that a first fluorescent tag associated with the first encapsulated food additive is within the consumer's mouth,
the activation source further configured to emit ultrasonic energy at a second frequency in the consumer's mouth to expose a second encapsulated food additive to the ultrasonic energy at the second frequency, the ultrasonic energy at the second frequency configured to release the second food additive from encapsulation based on a detection by the sensor that a second fluorescent tag associated with the second encapsulated food additive is within the consumer's mouth, wherein the first and second encapsulated food additives are surrounded by an acoustically reactive encapsulation layer.

* * * * *